United States Patent

Knoop et al.

(10) Patent No.: US 7,515,056 B2
(45) Date of Patent: Apr. 7, 2009

(54) METHOD AND APPARATUS FOR PREVENTING COLLISIONS OF VEHICLES

(75) Inventors: Michael Knoop, Ludwigsburg (DE); Martin Staempfle, Schwieberdingen (DE); Fred Oechsle, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/498,562

(22) Filed: Aug. 3, 2006

(65) Prior Publication Data

US 2006/0267748 A1    Nov. 30, 2006

Related U.S. Application Data

(62) Division of application No. 10/497,751, filed on Jun. 4, 2004, now Pat. No. 7,145,441.

(51) Int. Cl.
*G08B 23/00* (2006.01)
(52) U.S. Cl. .................. 340/576; 340/435; 180/272; 180/277
(58) Field of Classification Search .......... 340/575, 340/576, 435; 342/70–72; 180/271–280; 701/45–48
See application file for complete search history.

(56) References Cited

U.S. PATENT DOCUMENTS

| | | | |
|---|---|---|---|
| 5,410,304 A | 4/1995 | Hahn et al. | |
| 5,432,509 A * | 7/1995 | Kajiwara | ............... 340/903 |
| 5,479,173 A | 12/1995 | Yoshioka et al. | |
| 5,585,798 A | 12/1996 | Yoshioka et al. | |
| 5,861,836 A | 1/1999 | Hoess | |
| 6,037,860 A | 3/2000 | Zander et al. | |
| 6,289,281 B1 * | 9/2001 | Shinmura et al. | ............... 701/301 |
| 6,445,308 B1 | 9/2002 | Koike | |
| 6,553,130 B1 | 4/2003 | Lemelsn et al. | |
| 6,727,807 B2 * | 4/2004 | Trajkovic et al. | ............ 340/436 |
| 6,816,084 B2 | 11/2004 | Stein | |
| 2002/0121981 A1 * | 9/2002 | Munch | ............... 340/576 |
| 2003/0060956 A1 * | 3/2003 | Rao et al. | ............... 701/45 |
| 2003/0236605 A1 * | 12/2003 | Takahashi | ............... 701/45 |

FOREIGN PATENT DOCUMENTS

| | | |
|---|---|---|
| DE | 1 006 288 | 4/1957 |
| DE | 43 38 244 | 5/1994 |
| DE | 44 07 757 | 9/1994 |
| DE | 44 23 966 | 1/1995 |
| DE | 195 29 180 | 4/1997 |
| DE | 198 51 434 | 5/2000 |
| DE | 100 07 501 | 9/2001 |
| DE | 100 24 227 | 12/2001 |
| DE | 600 16 815 | 1/2006 |

(Continued)

*Primary Examiner*—Jeff Hofsass
*Assistant Examiner*—Hongmin Fan
(74) *Attorney, Agent, or Firm*—Michael J. Striker

(57) ABSTRACT

In a method for preventing collisions of vehicles, first the surroundings of a vehicle 2 and motion parameters of the vehicle 2 are detected by means of sensors 2.1, 2.2, 2.3, 2.4, 2.5. From the output signals of the sensors, a failure-to-yield criterion and a collision risk criterion are derived. From a combination of the failure-to-yield criterion and the collision risk criterion, a risk level is ascertained. Depending on the particular risk level ascertained, finally, steps for reducing the risk of collision are initiated.

14 Claims, 4 Drawing Sheets

FOREIGN PATENT DOCUMENTS

| | | |
|---|---|---|
| EP | 0 348 691 | 1/1990 |
| EP | 0 903 714 | 3/1999 |
| EP | 1 182 089 | 2/2002 |
| JP | 6-1222 | 1/1994 |
| JP | 6-12592 | 1/1994 |
| JP | 7-17347 | 1/1995 |
| JP | 2001-155298 | 6/2001 |

\* cited by examiner

METHOD AND APPARATUS FOR PREVENTING COLLISIONS OF VEHICLES

CROSS-REFERENCE TO A RELATED APPLICATION

This application is a division of patent application Ser. No. 10/497,751 filed on Jun. 4, 2004 now U.S. Pat. No. 7,145,441. The invention described and claimed hereinbelow is also described in German Patent Application DE 102 44 205.3 filed on Sep. 23, 2002. This German Patent Application, provides the basis for a claim of priority of invention under 35 U.S.C. 119(a)-(d).

BACKGROUND OF THE INVENTION

From German Patent Disclosure DE 197 36 774 A1 of the present Applicant, a method for information display in a motor vehicle is known that makes image-based laneholding possible. To that end, a video camera fixed in the vehicle is provided, which records the lanes located in front of the vehicle, including the traffic signs. The video signals furnished by the video camera are assessed for illegal driving conditions. If an illegal mode of driving is detected, such as exceeding the speed limit excessively, or passing in a segment of road where passing is prohibited, warning signals to the driver are generated.

From German Utility Model DE 298 02 953 U, an electronic system for detecting traffic signs and displaying them on a display is also known.

From German Utility Model DE 299 02 457 U1, also of the present Applicant, an apparatus for detecting the area around a vehicle and having a camera system for generating video signals is known that has at least two cameras with overlapping fields of view. The cameras furnish a stereoscopic video sequence to an image processing unit, which detects and classifies traffic signs on the basis of three-dimensional pattern recognition and image processing. Besides traffic signs, the apparatus is simultaneously capable of detecting vehicles driving or at a stop ahead of the vehicle and issuing warning signals, depending on the traffic situation, or actively intervening in the operating state of the vehicle. Examples given of active interventions of this kind are regulating the spacing between vehicles in stop-and-go traffic or long lines of traffic by intervention into the brake controller and engine controller of the vehicle, or triggering an automatic steering system.

From U.S. Pat. No. 6,049,295 A1, a method is known that is intended to prevent collisions between vehicles that are traveling through an intersection without traffic signs or along a poorly visible stretch of road. This method requires both a device fixed to the road and devices fixed to the vehicle, which communicate with one another by radio.

From German Patent Disclosure DE 198 30 547 A1, an intersection warning system is also known, which must likewise rely on devices on the road and devices in the vehicle.

SUMMARY OF THE INVENTION

The present invention has to do with advantageous further developments of the known system of the present Applicant which contribute to helping avoid especially frequent accidents caused by failures to yield and driving errors in turning traffic. It proceeds from the recognition that by means of autonomous detection in the vehicle of traffic signs and traffic signals, other vehicles and their motion parameters, and taking the motion parameters of the vehicle itself into account, a failure-to-yield criterion and a collision risk criterion, or an attentiveness criterion and a collision risk criterion, can be ascertained from which in turn a risk level can be derived. Depending on the risk level derived, it is then advantageously possible to take countermeasures to avoid an impending collision.

Thus at comparatively little risk, the driver can be made aware of the risk situation by optical and/or acoustical signals.

At a further escalation level, the brake system of the vehicle can be prepared for its imminent use by application of the brake linings to the brake disks and brake drums (prefilling) and optionally by adapting the threshold values of a braking assistant.

The attentiveness of the driver can also be enhanced further by outputting haptic signals, such as a warning braking action and/or throttling of the engine.

The vehicle motion can be varied by way of the steering and/or brake.

Irreversible restraint systems, such as belt tighteners and air bags, can also be prepared for their imminent use by adaptation of variable threshold values.

Finally, irreversible restraint systems can be tripped to protect vehicle passengers.

The method and apparatus of the invention will now be described in conjunction with the exemplary embodiments shown in the drawing.

DESCRIPTION OF THE PREFERRED EMBODIMENT

Figure 1:
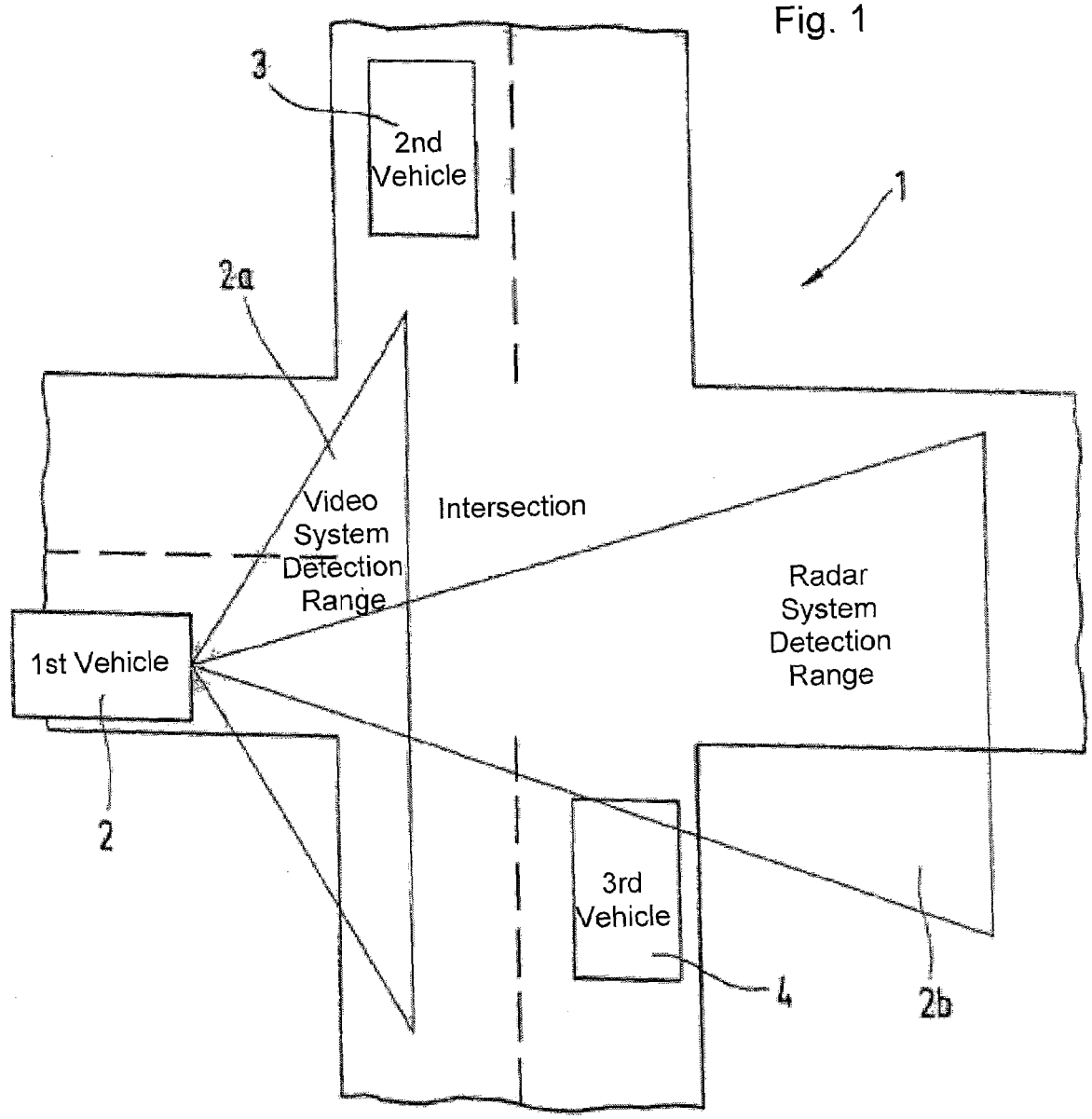
FIG. 1 shows a traffic situation at an intersection.
Figure 2:
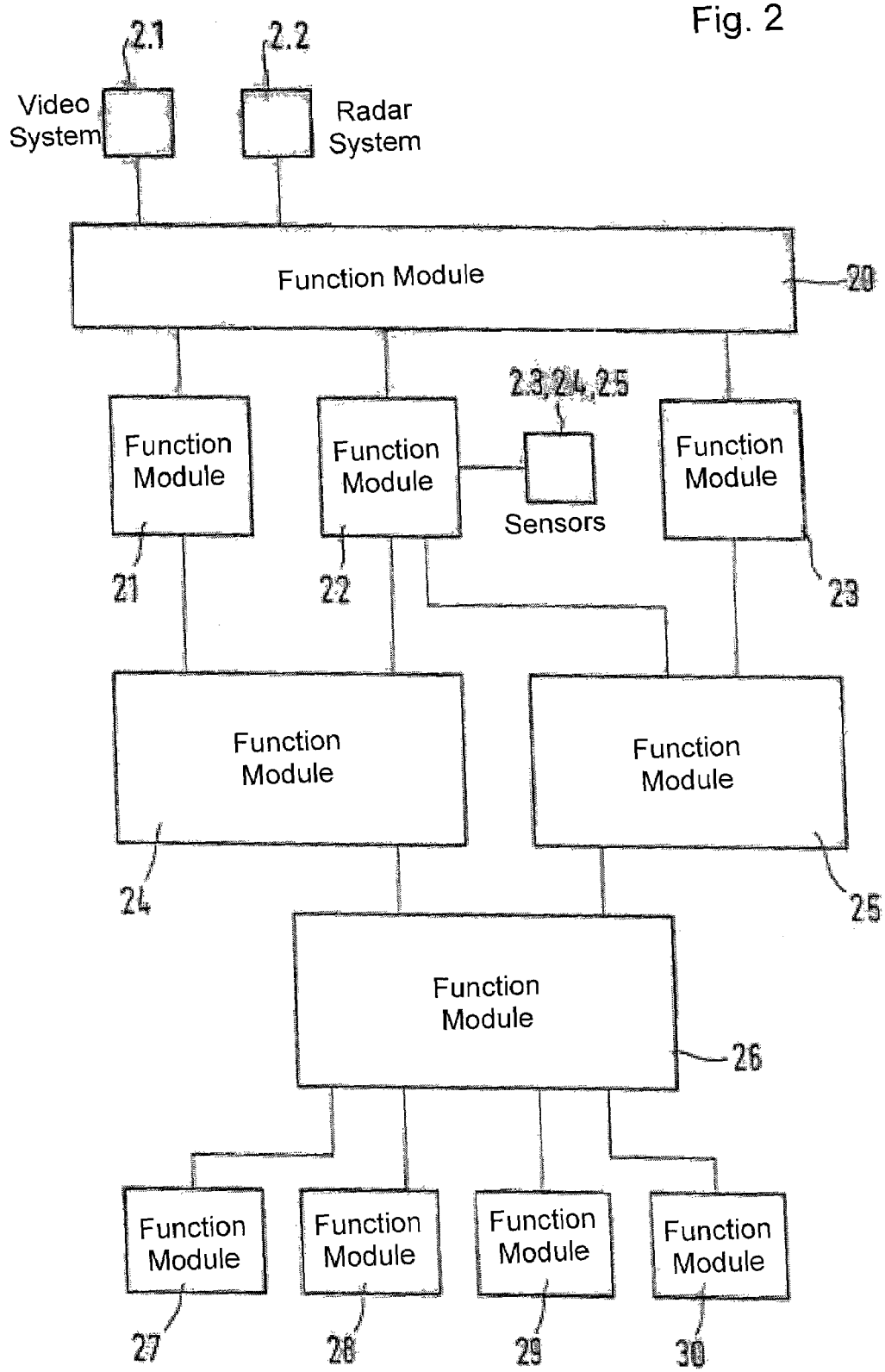
FIG. 2 is a first block diagram to explain the collision avoidance in the intersection traffic.

A first exemplary embodiment of the invention, in conjunction with FIG. 1 and FIG. 2 explains how a collision in the area of an intersection can be avoided. FIG. 1 shows a traffic situation at a schematically illustrated intersection 1. At this intersection 1, two streets, each with two lanes, meet. A first vehicle 2 (ego vehicle) approaches the intersection 1 on the street running east and west. On the street running north and south, a second vehicle 3 and a third vehicle 4 in oncoming traffic approach the intersection 1. The embodiment of the invention is realized in the vehicle 2. For that purpose, the vehicle 2 is equipped with a plurality of sensor systems. Hence the vehicle 2 includes at least one video system 2.1, fixed to the vehicle, with a detection range 2a. In addition, a radar system 2.2 fixed to the vehicle and having a detection range 2b can be provided. The detection ranges 2a, 2b extend variously far in the travel direction of the vehicle 2. The video system 2.1 is intended for detecting the close range, and the radar system 2.2 is intended for detecting a range located farther away. Alternatively or in addition, infrared and lidar systems, not provided here with their own reference numerals, may be provided. The vehicle 2 furthermore includes further sensor systems, such as a wheel rotation sensor 2.3, a yaw rate sensor 2.4, and a steering angle sensor 2.5, of the kind already known in conventional ABS and traction control systems.

FIG. 2 shows a block diagram for explaining collision avoidance in intersection traffic. The surrounding area sensor system, comprising the video system 2.1 and the radar system 2.2, is connected to a function module 20, which processes the output signals of these aforementioned systems. The function module 20 is connected to a further function module 21, to which the output signals of the function module 20 are delivered and which evaluates these output signals for the sake of detecting the lane and traffic signs. The function module 20 is also connected to a function module 22, to which on the one hand the output signals of the function module 20 and on the other the output signals of the further sensors, that is, the wheel rotation sensor 2.3, the yaw rate sensor 2.4, and the steering angle sensor 2.5, are delivered. The function module 22 serves to detect the motion of the vehicle to itself and to detect the wishes of the driver. Finally, the function module 20 is connected to a function module 23, which obtains information about the cross traffic from the output signals of the function module 20. The function modules 21 and 22 are connected on the output side to a further function nodule 24, which serves to ascertain a failure-to-yield criterion. The function module 22, together with the function module 23, is also connected to a further function module 25, which serves to ascertain a collision risk criterion. The function modules 24 and 25 are in turn connected to a function module 26, which serves to ascertain a risk level. On the output side, the function module 26 is connected to a plurality of function modules 27, 28, 29, 30. The function module 27 serves the purpose of optical, acoustical, and/or haptic signalling. The function module 28 trips restraint systems. The function module 29 acts on the engine controller. The function module 30, finally, acts on the brake system.

Below, the method of collision prevention in the intersection region will be described in detail. Upon an approach to the intersection 1, the video system 2.1 of the vehicle 2 detects traffic signs and light signals from many traffic light systems that may be present. In addition, the course of the edge of the roadway and, if corresponding markings or comparable boundaries are present, also the course of the travel-lane or lanes are detected. The output signals of the video system 2.1 are processed in the function module 20 and evaluated in the function module 21. As a result of the evaluation of the output signals of the video system 2.1, it is found how and on which lane the vehicle 2 is approaching the intersection 1, which traffic rules prescribe whatever traffic signs are present, and what the signal position of the traffic light system is. If there is cross traffic in the north-south direction, as indicated in FIG. 1 by the second vehicle 3 and the third vehicle 4, then these vehicles 3, 4 are likewise detected by the video system 2.1 and a radar system 2.2 that may additionally be provided. The output signals of these systems are processed by the function module 20 and evaluated by the function module 23. In addition to the presence of such vehicles 3, 4 in cross traffic, motion parameters of these vehicles, such as their speed and acceleration in particular, as well as optionally additional translational and rotational motion parameters, are also detected. With these measurement data, it is possible for the vehicle 2 to estimate the future travel behavior of the vehicles 3, 4 in advance with high reliability. Finally, with the aid of further on-board sensors, such as the wheel rotation sensor 2.3, yaw rate sensor 2.4, and steering angle sensor 2.5, as well as the function module 22, the motion status of the vehicle 2 itself and the wishes of its driver are also ascertained. For instance, a wish to turn can be detected from the position of the turn indicator, actuated beforehand by the driver, or from the predicted vehicle motion in proportion to the course of the travel lane can also be detected. This last proves appropriate because at intersections controlled by a traffic light, more than one travel direction sometimes share one lane, but the signals for these different directions can be different. For instance, the light can be green for those turning right but red for other travel directions. From the output signals of the function module 20, the function module 21 ascertains whether the vehicle 2 approaching the intersection 1 has the right of way, or not. If for instance it is found that this vehicle 2 does not have the right of way, then a failure-to-yield criterion is ascertained in the function module 24 from the output signals of the function modules 21 and 22. This failure-to-yield criterion is ascertained from the motion data of the vehicle 2 itself, such as its approach speed and acceleration, and the spacing of the vehicle 2 from the intersection 1. In addition, the reactions of the driver, such as turning the steering wheel, actuating the accelerator or brake pedal, and the like, are taken into account. If furthermore the presence of cross traffic (vehicles 3, 4) in the region of the intersection 1 is detected (function module 23), then from the motion data of the vehicle 2 itself and of the other vehicles 3, 4, that is, from the output signals of the function modules 22, 23, a collision risk criterion is ascertained in the function module 25. In practical terms, this collision risk criterion is a measure for the likelihood that a collision will occur between the vehicle 2 and another vehicle 3, 4. At each instant in calculation, the distances between the vehicle 2 and the other vehicles 3, 4, as well as motion parameters, are determined from measured values. With the aid of these data, motion trajectories of the vehicles 2, 3, 4 involved are predicted. It is taken into account in particular that the vehicles 2, 3, 4 may have different degrees of freedom of motion. This means that they may for instance be accelerated in the longitudinal and/or transverse direction. Within the scope of assumed comfort limits, that is, limit values that are still acceptable to vehicle passengers, acceleration values of up to $2.5$ $ms^{-2}$ in the longitudinal direction and up to approximately $5$ $ms^2$ in the transverse direction are assumed. As a result, the size of the area within which the vehicles involved might be located at a future instant increases with the prediction time. An especially expedient method for calculating the collision risk criterion compares the percentage of overlap of the future areas where the vehicles involved are located. In a further advantageous method for ascertaining the collision risk criterion, possible motion trajectories of the vehicle 2 itself that fall within the stopping distance of another vehicle 3, 4 are eliminated. by means of the collision risk criterion, then on the one hand the number of trajectories that still remain and in addition the acceleration to be brought to bear for every potential driving maneuver are then assessed. The greater the acceleration, the greater the risk and hence the greater the collision risk criterion. As already described above, the failure-to-yield criterion is also ascertained, in accordance with comparable standpoints. However, the situation to be observed is simpler, since a traffic sign and/or traffic light system are stationary objects whose three-dimensional boundaries at most still include the stop line.

With the aid of predeterminable control equipment, a risk level for the vehicle 2 itself is ascertained in the function module 26 from the collision risk criterion and the failure-to-yield criterion. Countermeasures that are executed by the function modules 27, 28, 29, 30 are associated with a defined risk level. For instance, let it be assumed that a failure-to-yield criterion greater than a predeterminable value 1, namely a value 2, is reached. At the same time, let it be assumed that the collision risk criterion has attained a value greater than a predeterminable value 3. This combination of the failure-to-yield criterion and the collision risk criterion is categorized in risk level A. As a reaction to the ascertainment of the risk level A, in this exemplary embodiment of the invention, a warning of an impending collision is given to the driver. Such a warning is accomplished by the function module 27. For warning the driver of a failure to yield and a collision risk caused as a result, various channels of perception are available. The driver can be warned on the one hand by an acoustical signal, such as a signal tone or an artificial voice. He can also be given a warning through an optical signal, such as a warning light or the display of the critical traffic sign on a display, in particular on a heads-up display. Finally, the driver can also be warned by means of a haptic signal, such as vibration of the vehicle pedals or the steering column.

Besides warning the driver, the possibility exists of preparing the vehicle 2 early for an impending emergency situation. For instance at risk level B, a braking event can be prepared for by applying the brake jaws (prefilling) and/or by modifying threshold values of a braking assistant. The function module 30 is responsible for this.

At risk level C, tripping threshold values of restraint systems, such as the air bag and belt tighteners, are modified, in the direction of greater sensitivity, by the function module 28.

At risk level D, an intervention is made into the engine controller by the function module 27, in order to reduce the driving moment of the engine.

At risk level E, via the function module 30, an intervention is made into the brake controller, and first a warning braking event is tripped, in order to focus the reaction readiness of the driver on a braking event. As a positive side effect, this also causes the vehicle to lose some of its energy of motion already.

At risk level F, with the activation of the function module 28, reversible restraint systems, such as belt tighteners, are tripped.

Finally, at risk level G, measures are taken that have a powerful influence on the vehicle motion itself. For instance, if a driver on approaching a stop sign or a traffic light that has turned red does not reduce his speed, then by the action of the function modules 29 and 30, the vehicle is braked sharply or even brought to a stop. This is especially true if cross traffic that has the right of way is on a collision course with the vehicle 2 itself.

It is within the scope of the invention to provide simplified exemplary embodiments as well. For instance, a smaller number of risk levels may be defined. Also, the type and number of reactions to a risk level can be reduced. For instance, the reaction can be limited to solely warning the driver, to preparatory measures, or to direct intervention, or an arbitrary combination of these.

A second exemplary embodiment of the invention will now be described in conjunction with FIG. 3 and FIG. 4; in it, the avoidance of a collision in oncoming traffic is of primary importance.

Figure 3:
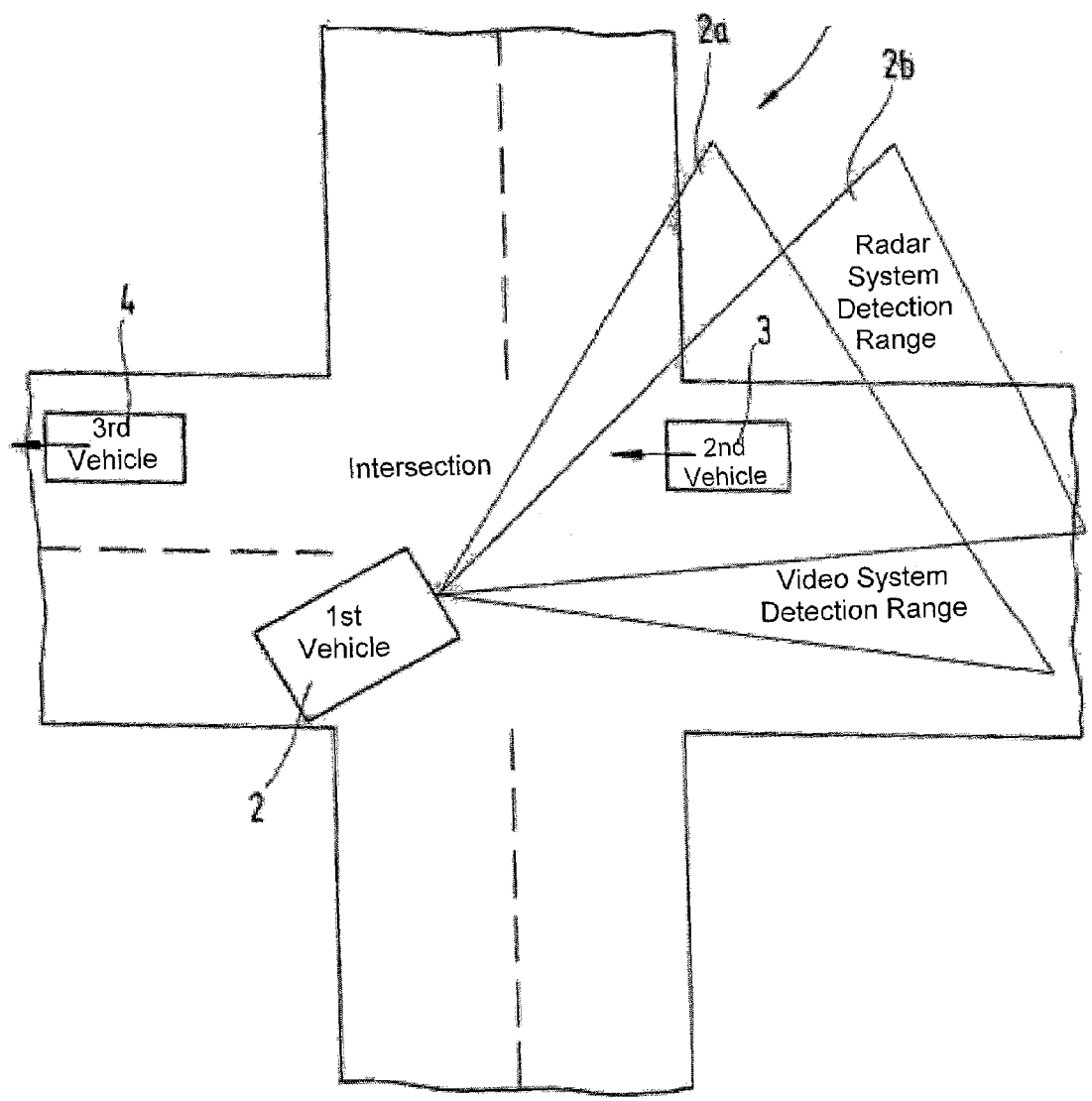
FIG. 3 shows a traffic situation with turning traffic.

FIG. 3 shows a traffic situation at a schematically illustration intersection 1. At this intersection 1, two streets each of two lanes meet. In the right lane of the street running east and west, a first vehicle 2 (ego vehicle) has approached the intersection 1 and is intending to turn left across the opposing lane, and then to continue its travel on the street running north and south. A second vehicle 3 and a third vehicle 4 are traveling in the left lane of the street running east and west. While the vehicle 4 has already left the intersection 1, the vehicle 3 is approaching the intersection 1 in oncoming traffic to the vehicle 2. The embodiment of the invention is realized in the vehicle 2. For that purpose, the vehicle 2 is equipped with a plurality of sensor systems. Hence the vehicle 2 includes at least one video system 2.1, fixed to the vehicle, with a detection range 2a, and a radar system 2.2 fixed to the vehicle and having a detection range 2b. The detection ranges 2a, 2b extend variously far in the travel direction of the vehicle 2. The video system 2.1 is intended for detecting the close range, and the radar system 2.2 is intended for detecting a range located farther away. Alternatively or in addition, infrared and lidar systems, not provided here with their own reference numerals, may be provided. The vehicle 2 furthermore includes further sensor systems, such as a wheel rotation sensor 2.3, a yaw rate sensor 2.4, and a steering angle sensor 2.5, of the kind already known in conventional ABS and traction control systems.

Figure 4:
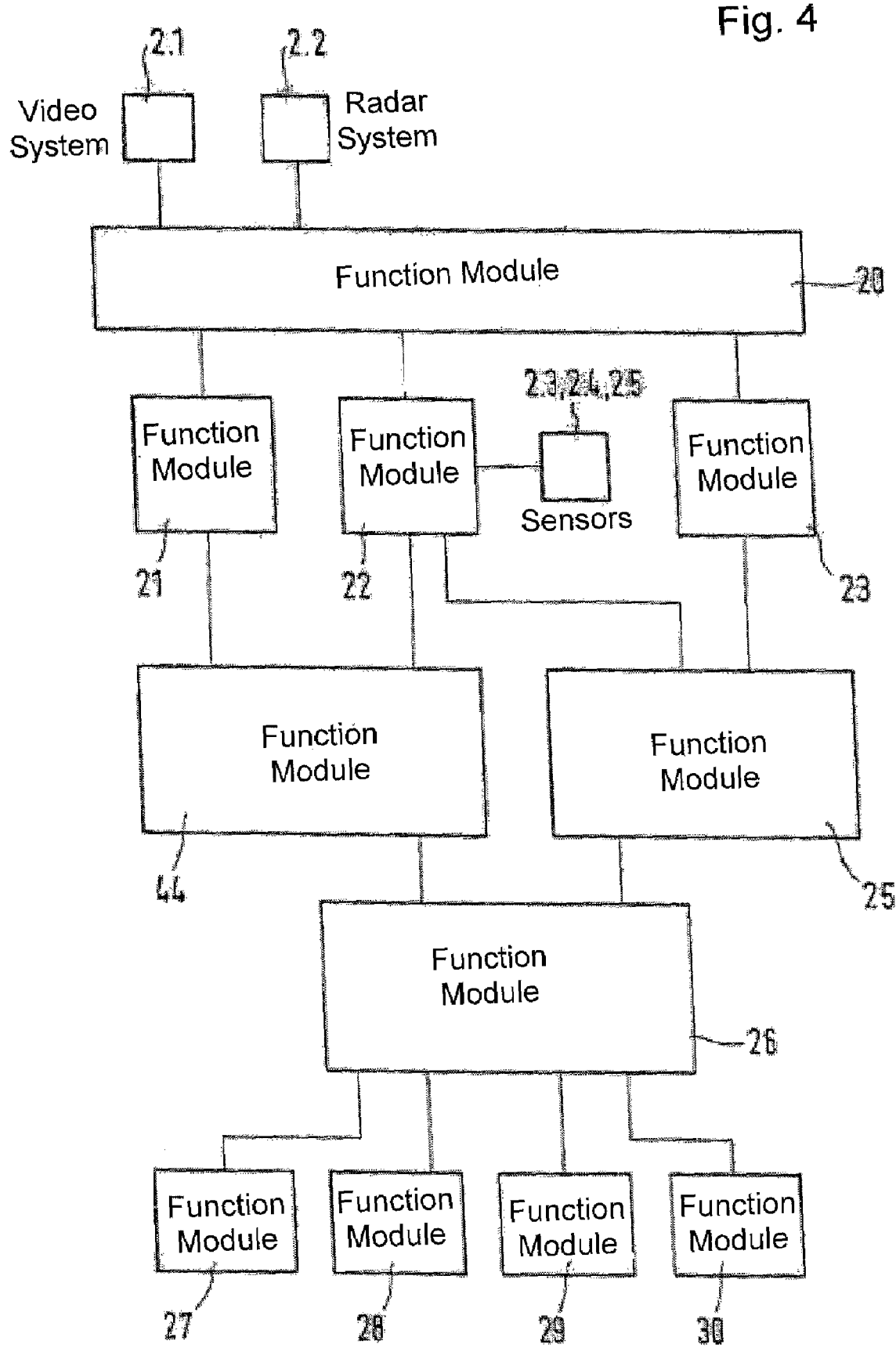
FIG. 4 shows a second block diagram to explain the collision avoidance in turning traffic.

FIG. 4 shows a block diagram for explaining collision avoidance in intersection traffic. The surrounding area sensor system, comprising the video system 2.1 and the radar system 2.2, is connected to a function module 20, which processes the output signals of these aforementioned systems. The function module 20 is connected to a further function module 21, to which the output signals of the function module 20 are delivered and which evaluates these output signals for the sake of detecting the lane and traffic signs. The function module 20 is also connected to a function module 22, to which on the one hand the output signals of the function module 20 and on the other the output signals of the further sensors, that is, the wheel rotation sensor 2.3, the yaw rate sensor 2.4, and the steering angle sensor 2.5, are delivered. The function module 22 serves to detect the motion of the vehicle to itself and to detect the wishes of the driver. Finally, the function module 20 is connected to a function module 23, which obtains information about the oncoming traffic from the output signals of the function module 20. The function modules 21 and 22 are connected on the output side to a further function module 44, which serves to ascertain an attentiveness criterion. The function module 22, together with the function module 23, is also connected to a further function module 25, which serves to ascertain a collision risk criterion. The function modules 24 and 25 are in turn connected to a function module 26, which serves to ascertain a risk level. On the output side, the function module 26 is connected to a plurality of function modules 27, 28, 29, 30. The function module 27 serves the purpose of optical, acoustical, and/or haptic signalling. The function module 28 trips restraint systems. The function module 29 acts on the engine controller. The function module 30, finally, acts on the brake system.

Below, the method of collision prevention in turning traffic will be described in detail. Upon an approach to the intersection 1, the video system 2.1 of the vehicle 2 detects traffic signs and light signals from many traffic light systems that may be present. In addition, the course of the edge of the roadway and, if corresponding markings or comparable boundaries are present, also the course of the travel lane or lanes are detected. The output signals of the video system 2.1 are processed in the function module 20 and evaluated in the function module 21. As a result if the evaluation of the output signals of the video system 2.1, it is found how and on which lane the vehicle 2 is approaching the intersection 1, which traffic rules prescribe whatever traffic signs are present, and what the signal position of the traffic light system is. If there is oncoming traffic in the east-west direction, as indicated in FIG. 3 by the second vehicle 3 and the third vehicle 4, then these vehicles 3, 4 are likewise detected by the video system 2.1 and the radar system 2.2, as long as they are located in the detection ranges 2a, 2b. In FIG. 3, this is true for the second vehicle 3. The third vehicle 4 is already located outside the detection ranges 2a, 2b and can therefore no longer be detected by the on-board video and radar systems 2.1, 2.2 of the vehicle 2. However, this is unnecessary anyway, since the vehicle 4 has already moved away in the opposite direction from the intersection 1, and there is no longer any risk of collision whatever between the vehicles 2, 3. The output signals of these systems are processed by the function module 20 and evaluated by the function module 23. In addition to the presence of such a vehicle 3 in oncoming traffic, motion parameters of this vehicle, such as its speed and acceleration in particular, and optionally additional translational and rotational motion parameters, are also detected. With these measurement data, it is possible for the vehicle 2 to estimate the future travel behavior of the vehicle 3 in advance with high reliability. Finally, with the aid of further on-board sensors, such as the wheel rotation sensor 2.3, yaw rate sensor 2.4, and steering angle sensor 2.5, as well as the function module 22, the motion status of the vehicle 2 itself and the wishes of its driver are also ascertained. For instance, a wish to turn can be detected from the position of the turn indicator, actuated beforehand by the driver, or from the predicted vehicle motion in proportion to the course of the travel lane can also be detected.

If on the basis of the output signals output by the sensors a turning event to the left across the opposite lane is detected and in addition the vehicle 3 approaching in oncoming traffic is detected, then in the function module 25, from the output signals of the function modules 22 and 23, a collision risk criterion is derived. In particular the distance between the two vehicles 2 and 3, their speeds, and their acceleration are taken into account. From the driver's reaction, such as braking or acceleration, and from the information about the course of the travel lane of the vehicle itself, and the course of the priority road, an attentiveness criterion A is ascertained, which in practical terms is a measure of the capability of the driver of the vehicle 2 to react in this kind of turning situation. This attentiveness criterion is ascertained in the function module 44 from the output signals of the function modules 21 and 22. The attentiveness criterion indicates whether the driver has reacted to a changing situation. For instance if in a turn to the left across the oncoming lane oncoming traffic appears, the driver of the vehicle 2 itself can detect the resultant danger and can brake the vehicle 2 by taking his foot off the gas and/or actuating the brake pedal. The driver can also undo the steering lock again. Hence the vehicle 2 could drive into the intersection 1 without risk, even though the apparatus has detected a collision risk. In the situation described above, the attentiveness criterion is high, because the demand of the apparatus to react by reducing the travel speed and/or performing a deflecting maneuver is largely matched by the actual reaction of the driver. The demand for reaction by the apparatus is directed to trajectories that can be driven without risk, that is, trajectories that do not collide. In a concrete example, a value for the attentiveness criterion can be ascertained by subtracting the set-point value of the deceleration of the vehicle from the actual deceleration value and standardizing it for the acceleration caused by gravity. The same procedure can also be applied to changes in acceleration. With the aid of predeterminable control equipment, a risk level for the vehicle 2 itself is ascertained in the function module 26 from the collision risk criterion and the attentiveness criterion. For instance, if the collision risk criterion K is greater than a first value 1, and the attentiveness criterion is greater than a value 2, then a risk level A has been reached. Predefinable countermeasures that are performed by the function modules 27, 28, 29, 30 are associated with a certain risk level. As a reaction to the ascertainment of the risk level A, in this second exemplary embodiment of the invention, a warning to the driver of an impending collision with the vehicle 3 approaching in oncoming traffic is contemplated. Such a warning is accomplished by the function module 27.

For warning the driver of a failure to yield and a collision risk caused as a result, various channels of perception are available. The driver can be warned on the one hand by an acoustical signal, such as a signal tone or an artificial voice. He can also be given a warning through an optical signal, such as a warning light or the display of the critical traffic sign on a display, in particular on a heads-up display. Finally, the driver can also be warned by means of a haptic signal, such as vibration of the vehicle pedals or the steering column.

Besides warning the driver, the possibility exists of preparing the vehicle 2 early for an impending emergency situation. For instance at risk level B, a braking event can be prepared for by applying the brake jaws (prefilling) and/or by modifying threshold values of a braking assistant. The function module 30 is responsible for this.

At risk level C, tripping threshold values of restraint systems, such as the air bag and belt tighteners, are modified, in the direction of greater sensitivity, by the function module 28.

At risk level D, an intervention is made into the engine controller by the function module 27, in order to reduce the driving moment of the engine.

At risk level E, via the function module 30, an intervention is made into the brake controller, and first a warning braking event is tripped, in order to focus the reaction readiness of the driver on a braking event. As a positive side effect, this also causes the vehicle to lose some of its energy of motion already.

At risk level F, with the activation of the function module 28, reversible restraint systems, such as belt tighteners, are tripped.

Finally, at risk level G, measures are taken that have a powerful influence on the vehicle motion itself. For instance, if a driver, despite a high risk of collision, fails to reduce his speed, then by the action of the function modules 29 and 30, the vehicle is braked sharply or even brought to a stop. This is especially true if cross traffic that has the right of way is on a collision course with the vehicle 2 itself.

It is within the scope of the invention to provide simplified exemplary embodiments as well. For instance, a smaller number of risk levels may be defined. Also, the type and number of reactions to a risk level can be reduced. For instance, the reaction can be limited to solely warning the driver, to preparatory measures, or to direct intervention, or an arbitrary combination of these.

The invention claimed is:

1. A method for preventing collisions of vehicles in oncoming and turning traffic, in which the surroundings of a vehicle and motion parameters of a vehicle are ascertained by means of sensors, wherein:
   from output signals of the sensors (2.1, 2.2, 2.3, 2.4, 2.5), a driver attentiveness criterion (A), which is a measure of the capability of a driver of the vehicle to react to a turning situation, and a collision risk criterion (K) are derived;
   from a combination of the driver attentiveness criterion (A) and the collision risk criterion (K), a risk level is ascertained; and
   as a function of the risk level ascertained, predeterminable steps for reducing a collision risk are initiated.

2. The method of claim 1, wherein the driver attentiveness criterion (A) and the collision risk criterion (K) are staggered as a function of risk in such a way that when the driver attentiveness criterion (A) and collision risk criterion (K) are combined, a risk-dependent classification of the risk level results.

3. The method of claim 1, wherein the predetermined steps for reducing the collision risk are staggered as a function of risk.

4. The method of claim 1, wherein the steps for reducing the collision risk include a warning to the driver, a preparation of vehicle systems for imminent use, active interventions into a steering system, a brake system and an engine control system, and an activation of restraint systems.

5. The method of claim 4, wherein the warning to the driver is effected by means of optical, acoustical and haptic signals.

6. The method of claim 4, wherein the haptic signals include a vibration of an element selected from the group consisting of vehicle pedals, a steering column and both of a vehicle (2).

7. The method of claim 1, wherein the surroundings of the vehicle (2) and the motion parameters of the vehicle (2) are detected by means of the sensors (2.1, 2.2, 2.3, 2.4, 2.5), which are on-board sensors.

8. The method of claim 1, wherein the surroundings of the vehicle (2) are detected by means of one of the sensors which is at least one video system (2.1).

9. The method of claim 1, wherein the surroundings of the vehicle (2) are additionally detected with one of the sensors which is at least one radar system (22).

10. The method of claim 1, wherein motion parameters of the vehicle (2) are detected with a plurality of the sensors, in particular by means of wheel rotation sensors (2.3), yaw rate sensors (2.4), and steering angle sensors (2.5).

11. The method of claim 1, wherein the driver attentiveness criterion (A) is ascertained from data on the surroundings, detected by one of the sensors which is at least one video system (2.1), such as a course of the travel lane and traffic signs, and from motion parameters of the vehicle to itself, such as its travel speed and vehicle acceleration, and from reactions of the driver, such as actuation of an accelerator or a brake pedal.

12. The method of claim 1, wherein the collision risk criterion (K) is derived from the motion parameters, obtained by one of the sensors selected from the group consisting of an on-board video system (2.1), a radar system (2.2) and both, of other vehicles (3, 4) forming an oncoming traffic, and from the motion parameters of the vehicle (2) itself, obtained by further sensor systems, including the sensors such as the wheel rotation sensor (2.3), yaw rate sensor (2.4) and steering angle sensor (2.5).

13. An apparatus for performing the method of claim 1, wherein:

the apparatus includes sensors for detecting the surroundings, such as at least one video system (2.1) and optionally in addition at least one radar system (2.2) or lidar system, and a plurality of sensors for detecting motion parameters of a vehicle (2), such as in particular a wheel rotation sensor (2.3), a yaw rate sensor (2.4), and a steering angle sensor (2.5);

the apparatus further includes one function module (20) for processing output signals of the sensors (2.1, 2.2) and one function module (22) for processing output signals of the sensors (2.3, 2.4, 2.5);

the apparatus furthermore includes one function module (44) for ascertaining a attentiveness criterion (A), which is a measure of a capability of a driver of a vehicle to react to a turning situation from output signals of function modules (21, 22) and one function module (25) for ascertaining a collision risk criterion (K) from the output signals of the function modules (22, 23); and the apparatus furthermore includes one function module (26) for processing output signals of function modules (24, 25), in which processing, from a combination of the driver attentiveness criterion (A) and the collision risk criterion (K), a risk level is determined, and in which the apparatus finally includes function modules (27, 28, 29, 30), which are triggerable by output signals of the function module (26) and which, as a function of a type of risk level, furnish control signals for controlling optical, acoustical and haptic signal devices, restraint systems an engine controller, a brake system, and a steering system of the vehicle (2).

14. An apparatus for preventing collisions of vehicles in oncoming and turning traffic comprising: sensors for ascertaining the surroundings of a vehicle and motion parameters of a vehicle; means for deriving from output signals of the sensors (2.1, 2.2, 2.3, 2.4, 2.5), a driver attentiveness criterion (A), which is a measure of a driver of a vehicle to react to a turning situation, and a collision risk criterion (K); means for ascertaining, from a combination of the driver attentiveness criterion (A) and the collision risk criterion (K), a risk level; and means for initiating, as a function of the risk level ascertained, predeterminable steps for reducing a collision risk.

* * * * *